United States Patent
Koo

(10) Patent No.: US 8,279,830 B2
(45) Date of Patent: Oct. 2, 2012

(54) METHOD OF PERFORMING HANDOVER FOR A DUAL TRANSFER MODE IN A WIRELESS MOBILE COMMUNICATION SYSTEM

(75) Inventor: Hyoun Hee Koo, Gwangju (KR)

(73) Assignee: LG Electronics Inc., Seoul (KR)

( * ) Notice: Subject to any disclaimer, the term of this patent is extended or adjusted under 35 U.S.C. 154(b) by 693 days.

(21) Appl. No.: 11/914,546

(22) PCT Filed: Apr. 5, 2006

(86) PCT No.: PCT/KR2006/001257
§ 371 (c)(1),
(2), (4) Date: Sep. 19, 2008

(87) PCT Pub. No.: WO2006/123863
PCT Pub. Date: Nov. 23, 2006

(65) Prior Publication Data
US 2009/0213809 A1    Aug. 27, 2009

(30) Foreign Application Priority Data
May 16, 2005 (KR) .................. 10-2005-0040648

(51) Int. Cl.
*H04W 4/00* (2009.01)
*H04B 7/00* (2006.01)
(52) U.S. Cl. ......... 370/331; 370/330; 370/328; 370/310
(58) Field of Classification Search .................. 370/331, 370/349, 352, 435.1, 435.2, 435.3, 330, 328, 370/310; 455/437, 438, 439
See application file for complete search history.

(56) References Cited

U.S. PATENT DOCUMENTS

| 5,659,598 | A | 8/1997 | Byrne et al. |
| 6,333,789 | B1* | 12/2001 | Shima .......................... 358/1.15 |
| 6,771,964 | B1* | 8/2004 | Einola et al. .................. 455/437 |
| 2004/0184439 | A1* | 9/2004 | Blanc et al. .................... 370/349 |
| 2005/0037757 | A1 | 2/2005 | Moon et al. |

FOREIGN PATENT DOCUMENTS

| CN | 1115593 | 1/1996 |
| CN | 1582053 | 2/2005 |
| JP | 2000209633 | 7/2000 |

(Continued)

OTHER PUBLICATIONS

3GPP TS 04.18, "Mobile radio interface layer 3 specification; Radio Resource Control Protocol", Jul. 2003, 3GPP, all pages.*

(Continued)

*Primary Examiner* — Kwang B Yao
*Assistant Examiner* — Adam Duda
(74) *Attorney, Agent, or Firm* — Lee, Hong, Degerman, Kang & Waimey

(57) ABSTRACT

A method of performing Dual Transfer Mode (DTM) handover by a mobile station (MS) in a wireless mobile communication system is disclosed. More specifically, the MS receives information of neighbor cells, wherein the information is a list of neighbor cells whose signal strengths the MS should measure and transmits a message including results of the measured neighbor cells. Furthermore, the MS receives a message from a network, wherein the message is a DTM Handover Command message which instructs the MS to perform a DTM handover procedure with one of the neighbor cells. Lastly, the MS performs the DTM handover procedure.

8 Claims, 8 Drawing Sheets

FOREIGN PATENT DOCUMENTS

| | | |
|---|---|---|
| JP | 2004187292 | 7/2004 |
| RU | 2180159 | 2/2002 |
| RU | 2249917 | 4/2005 |
| RU | 2265287 | 11/2005 |
| WO | 2004/036947 | 4/2004 |
| WO | 2005125239 | 12/2005 |
| WO | 2006/092769 | 9/2006 |

OTHER PUBLICATIONS

3GPP TS 08.08, "Mobile-services Switching Centre—Base Station System (MSC—BSS) interface; Layer 3 specification", Sep. 2003, 3GPP, all pages.*

3GPP TS 09.08, "Application of the GBase Station System Application Part (BSSAP) on the E-interface", Mar. 2003, 3GPP, all pages.*

3GPP TS 43.055, "Dual Transfer Mode", Aug. 2003, 3GPP, all pages.*

3GPP "Technical specification group GSM/EDG radio access network, Radio subsystem link control," Release 6, 3GPP TS 45.008, v6.6.0, Feb. 2004.

Putz. S. et al. "Secure interoperation between 2G and 3G mobile radio networks." ISBN: 0-85296-726, Aug. 6, 2002.

3rd Generation Partnership Project (3GPP), "Technical Specification Group GSM/EDGE Radio Access Network; Radio Subsystem Link Control (Release 6)," Technical Specification 3GPP TS 45.008, V6.12.0, Apr. 2005.

3rd Generation Partnership Project (3GPP), "Technical Specification Group GSM/EDGE Radio Access Network; Dual Transfer Mode (DTM); Stage 2 (Release 6)," Technical Specification 3GPP TS 43.055, V6.9.0, Apr. 2005.

Siemens, "Enhanced DTM Handover and Its Impact on PS Handover," 3GPP TSG GERAN#24, GP-050704, Apr. 8, 2005.

Nokia, "DTM Handover—Parallel CS and PS Handovers," 3GPP TSG GERAN2 #24bis, TDoc G2-050257, May 23, 2005, XP-002399614.

Siemens, "Enhanced DTM Handover Issues," 3GPP TSG GERAN#25, Tdoc GP-051486, Jun. 20, 2005, XP-002399615.

* cited by examiner

METHOD OF PERFORMING HANDOVER FOR A DUAL TRANSFER MODE IN A WIRELESS MOBILE COMMUNICATION SYSTEM

CROSS-REFERENCE TO RELATED APPLICATIONS

This application is a national stage application of International Application No. PCT/KR06/01257, filed on Apr. 5, 2006, which claims the benefit of earlier filing date and right of priority to Korean Application No. 10-2005-0040648, filed on May 16, 2005.

TECHNICAL FIELD

The present invention relates to a method of performing handover, and more particularly, to a method of performing handover for Dual Transfer Mode (DTM) in a wireless mobile communication system.

BACKGROUND ART

According to access methods, such as a Circuit Switched (CS), a Packet Switched (PS), and a Core Network (CN), a Global System for Mobile Communication (GSM)/General Packet Radio Service (GPRS)/Enhanced Data Rates for GSM Evolution (EDGE) system can be classified into three (3) classes, namely, Class A, Class B, and Class C. In Class A, a mobile station (MS) can receive the CS and the PS services simultaneously. In Class B, the MS can receive the CS service and the PS service but cannot receive both services simultaneously. In Class C, the MS can receive either the CS service or the PS service.

In the GSM/GPRS/EDGE system, a dedicated mode, a packet transfer mode, and a Dual Transfer Mode (DTM) can be supported. The dedicated mode indicates the MS having the CS connection, the packet transfer mode indicates the MS having the PS connection, and the DTM indicates the MS having both the CS and the PS connections.

According to conventional art, the GSM/GPRS system, which is represented by the CS connection, supports hard handover. In addition, the GSM/GPRS system also supports handover in connection with the PS connection.

The conventional art does not provide detail explanation of the handover procedure for the DTM. More specifically, if handover is takes place when the MS has the CS connection during DTM, then the PS connection is released, and the CS handover procedure is performed in a same manner as if the MS is in the dedicated mode. Alternatively, if only the CS connection is released in DTM, then the PS connection is also released, thus entering idle mode. Thereafter, the MS enters the packet transfer mode from idle mode.

Currently, a Wideband Code Division Multiple Access (WCDMA) system supports services that allow data from the CS connection and the PS connection to be received simultaneously. In addition, it is possible for handover procedure to take place between the WCDMA system and the GSM/GPRS/EDGE system. However, if the GSM/GPRS/EDGE system does not support handover procedure during DTM, then the services enjoyed in the WCDMA cannot be received. That is, the data through the CS connection and the PS connection cannot be simultaneously received during DTM of the GSM/GPRS/EDGE system.

Consequently, the MS cannot efficiently perform handover procedure. Furthermore, the MS cannot reflect or incorporate priority in performing handover procedure even if one of the CS or the PS is considered more important.

DESCRIPTION OF THE INVENTION

Accordingly, the present invention is directed to a method of performing handover for Dual Transfer Mode (DTM) in a wireless mobile communication system that substantially obviates one or more problems due to limitations and disadvantages of the related art.

An object of the present invention is to provide a method of performing a Dual Transfer Mode (DTM) handover by a mobile station (MS) in a wireless mobile communication system.

Another object of the present invention is to provide a method of supporting a Dual Transfer Mode (DTM) handover by a network in a wireless mobile communication system.

A further object of the present invention is to provide a device for performing a Dual Transfer Mode (DTM) handover in a wireless mobile communication system.

Another object of the present invention is to provided a system for performing and supporting a Dual Transfer Mode (DTM) handover by a Mobile Station (MS) and a network in a wireless mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing a Dual Transfer Mode (DTM) handover by a mobile station (MS) in a wireless mobile communication system includes the MS for receiving information of neighbor cells, wherein the information is a list of neighbor cells whose signal strengths the MS should measure and transmits a message including results of the measured neighbor cells. Furthermore, the MS receives a message from a network, wherein the message is a DTM Handover Command message which instructs the MS to perform a DTM handover procedure with one of the neighbor cells. Lastly, the MS performs the DTM handover procedure.

In another aspect of the present invention, a network transmits information of neighbor cells, wherein the information is a list of neighbor cells whose signal strengths the MS should measure and receives a message including results of the measured signal strengths of the neighbor cells. Furthermore, the network transmits a message to the MS from a network, wherein the message is a DTM Handover Command message which instructs the MS to perform a DTM handover procedure with one of the neighbor cells.

In further aspect of the present invention, a device for performing a Dual Transfer Mode (DTM) handover in a wireless mobile communication system comprises a receiving block of a Radio Frequency (RF) module for receiving information of neighbor cells, wherein the information is a list of neighbor cells whose signal strengths the device should measure, and receiving a message from a network, device to perform a DTM handover procedure with one of the neighbor cells. The device also comprises a transmitting block of the RF module for transmitting a message including results of the measured signal strengths of the neighbor cells.

In another aspect of the present invention, a system for performing and supporting a Dual Transfer Mode (DTM) handover by a Mobile Station (MS) and a network in a wireless mobile communication system comprises the network which transmits information of neighbor cells, wherein the information is a list of neighbor cells whose signal strengths the MS should measure, receives results of the measured signal strengths of the neighbor cells from a transmitting block of a Radio Frequency (RF) module of the MS, and transmits a DTM Handover Command message which instructs the MS to perform a DTM handover procedure with one of the neighbor cells. The system also comprises the RF module of the MS which receives at a receiving block the information of neighbor cells including the list of neighbor cells whose signal strengths the MS should measure, transmits from the transmitting block the results of the measured signal strengths of the neighbor cells, and receives at the receiving block the DTM Handover Command message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
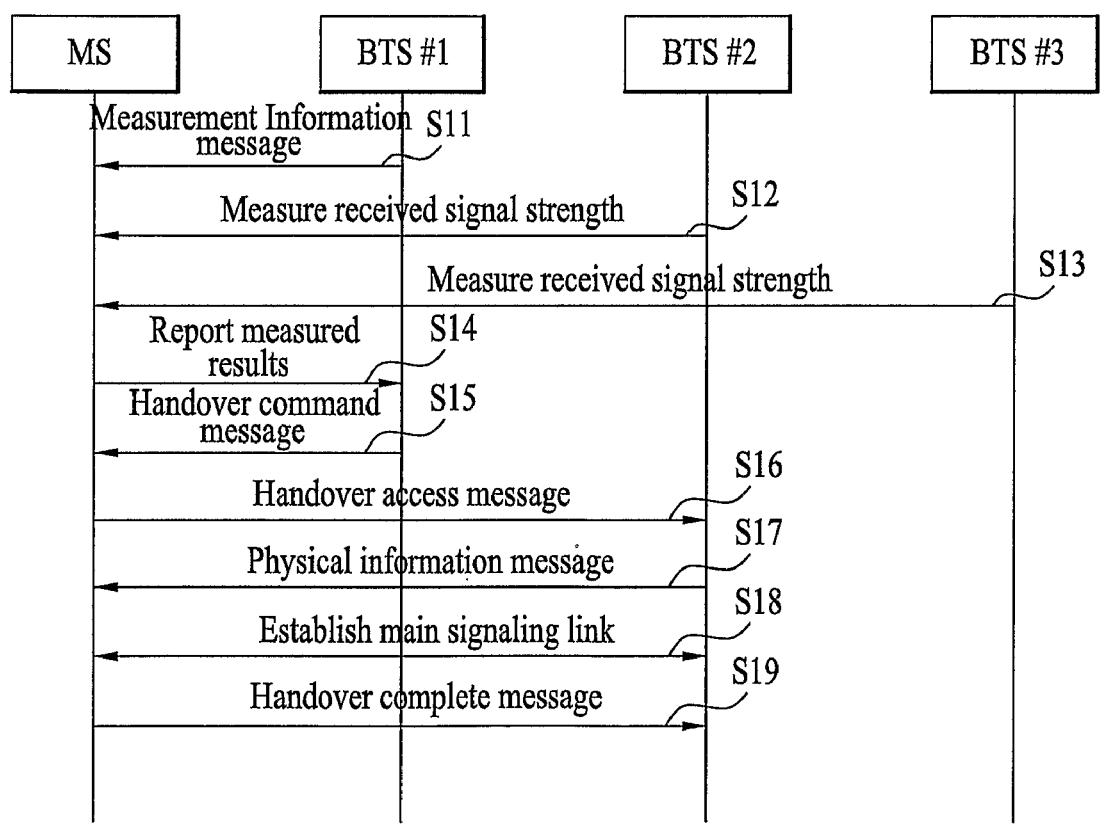
FIG. 1 illustrates an example of a handover procedure in a dedicated mode.

FIG. 1 illustrates an example of a handover procedure in a dedicated mode. As illustrated in FIG. 1, the MS receives from Cell #1, which has a CS connection with the MS, a list of neighbor cells for measuring signal strengths and/or signal qualities transmitted from the neighbor cells (S11). Here, the list of neighbor cells is transmitted to the MS via a Measurement Information message. Moreover, Cell #1 is a cell which currently has established connection with the MS.

After receiving the list of neighbor cells via the Measurement Information message, the MS measures the signal strengths and/or signal qualities transmitted from the neighbor cells (e.g., Cell #2, Cell #3) which are in the list of neighbor cells (S12, S13). Here, the MS measures the strength of signals transmitted on a Broadcast Control Channel (BCCH). The measured signal strength/quality is transmitted to Cell #1 via a Measurement Report message. More specifically, the measured signal strength and/or quality information can be included in a Measurement Result Information Element, which is included in the Measurement Report message (S14). Furthermore, parameters (e.g., RX_LEV and RX_QUAL) included in the Measurement Result Information Element can be used to transmit the values of the measured results to each corresponding neighbor cells. Hereafter, signal strength can be used interchangeably with signal quality or to indicate both signal strength and signal quality.

When Cell #1 determines that a handover procedure should be performed with the MS, using the measured signal strength information of the neighbor cells as the basis, Cell #1 transmits a Handover Command message to the MS (S15). Here, the Handover Command message can be transmitted on a Dedicated Control Channel (DCCH).

After receiving the Handover Command message, the MS transmits a Handover Access message to Cell #2 which is designated through the Handover Command message (S16). In response, Cell #2 transmits to the MS a Physical Information message which includes Timing Advance (TA) value (S17). The TA value represents an offset value caused by propagation delay between the MS and Cell #2.

Thereafter, the MS can know the exact timing information on the boundaries of the time slots with the TA value and then the MS can know the necessary information transmitted from Cell #2 to establish a main signaling link between Cell #2 and the MS (S18). After establishing the main signaling link with Cell #2, the MS transmits a Handover Complete message to Cell #2 (S19) and completes the handover procedure. As for Cell #1, it transmits the Handover Complete message to a Base Station Controller (BSC) to notify that a connection exists between Cell #2 and the MS. Lastly, the BSC disconnects or releases the channels which have been allocated to Cell #1. Hereafter, the BSC can be referred to as a network or alternatively, a Base Transceiver Station (BTS).

As mentioned above, the GSM/GPRS/EDGE system supports a packet transfer mode in addition to the dedicated mode. If the MS has to perform handover procedure during the packet transfer mode, the MS releases the PS connection for a specified time and enters packet idle mode. While in the packet idle mode, the MS selects a new cell through a cell reselection procedure and re-establishes the PS connection with the new cell so as to continue to transmit/receive packet data. In the cell reselection procedure, similar to the CS handover procedure, the cell receives information related to the MS measured signal strengths of neighbor cells. With this information, the cell transmits information on whether to perform handover and with which cell to perform handover.

Further to the two modes discussed above, the GSM/GPRS/EDGE system supports the Dual Transfer Mode (DTM). According to the DTM enhancement scheme, the PS connection can be maintained even if the CS connection is released during DTM. The DTM enhancement scheme can be applied when both the MS and the cell supports this scheme.

The operation of handover procedure during DTM will be discussed in detail. Since the handover procedures for the CS connection is similar to that of the PS connection, the CS handover and the PS handover can be performed independently. More specifically, the MS receives from a current cell (e.g., Cell #1) a list of neighbor cells, whose strength of signals transmitted on the BCCH are measured by the MS. In the dedicated mode, the idle mode, the packet idle mode, or the packet transfer mode, the MS regularly measures the signal strengths transmitted on the BCCH corresponding to each neighbor cells included in the list of neighbor cells. In addition, even when a Packet Broadcast Control Channel (PBCCH) for the PS service is supported, the signal strengths transmitted on the PBCCH, instead of the BCCH, can be measured with respect to the PS connection.

When handover procedure is performed for each of the PS connection and the CS connection during DTM, an issue of priority between the PS and the CS can arise. In other words, the issue relates to which handover procedure should be first performed between the PS and the CS handovers. In the conventional GSM/GPRS/EDGE system, the handover for the CS was performed first. However, with increasing number of diverse PS-based services becoming prevalent, at times, the packet-based service can be considered more important than voice communication service (i.e., CS service). For example, assume that the MS is using the voice communication service (e.g., talking on the phone) while being connected to an internet service. If the MS is performing an operation through the internet (e.g., internet banking), in such a situation, the packet-based service (i.e., PS service) should be considered more important than the voice communication service (i.e., CS service) such as a phone conversation.

Furthermore, in DTM handover, the priority with respect to which handover procedure should be first performed between the CS and the PS should be considered. However, since the degree of importance between the CS and the PS can change based on the request or configuration by the user, the MS can determine the priority between the CS and the PS at the application layer. For example, in a situation where the DTM handover is performed, the MS can configure a specific parameter to assign priority between the CS and the PS at the application layer. In detail, the specific parameter can be referred to as 'Priority_DTM.' If the specific parameter is configured to 'Priority_DTM=CS channel,' then the CS connection is given priority over the PS connection when handover arises during DTM. Alternatively, if the specific parameter is configured to 'Priority_DTM=PS channel,' then the PS connection is given priority over the CS connection when handover arises during DTM. Although a value of 'Priority_DTM' can be modified by a user, a default setting can be configured to favor the CS connection (i.e. 'Priority_DTM=CS channel'). In addition, the value of 'Priority_DTM' determined at the application layer can be transmitted to the cell via a MS classmark 3 Information Element (IE) and a MS Radio Access Capability (RAC) IE.

Figure 2:
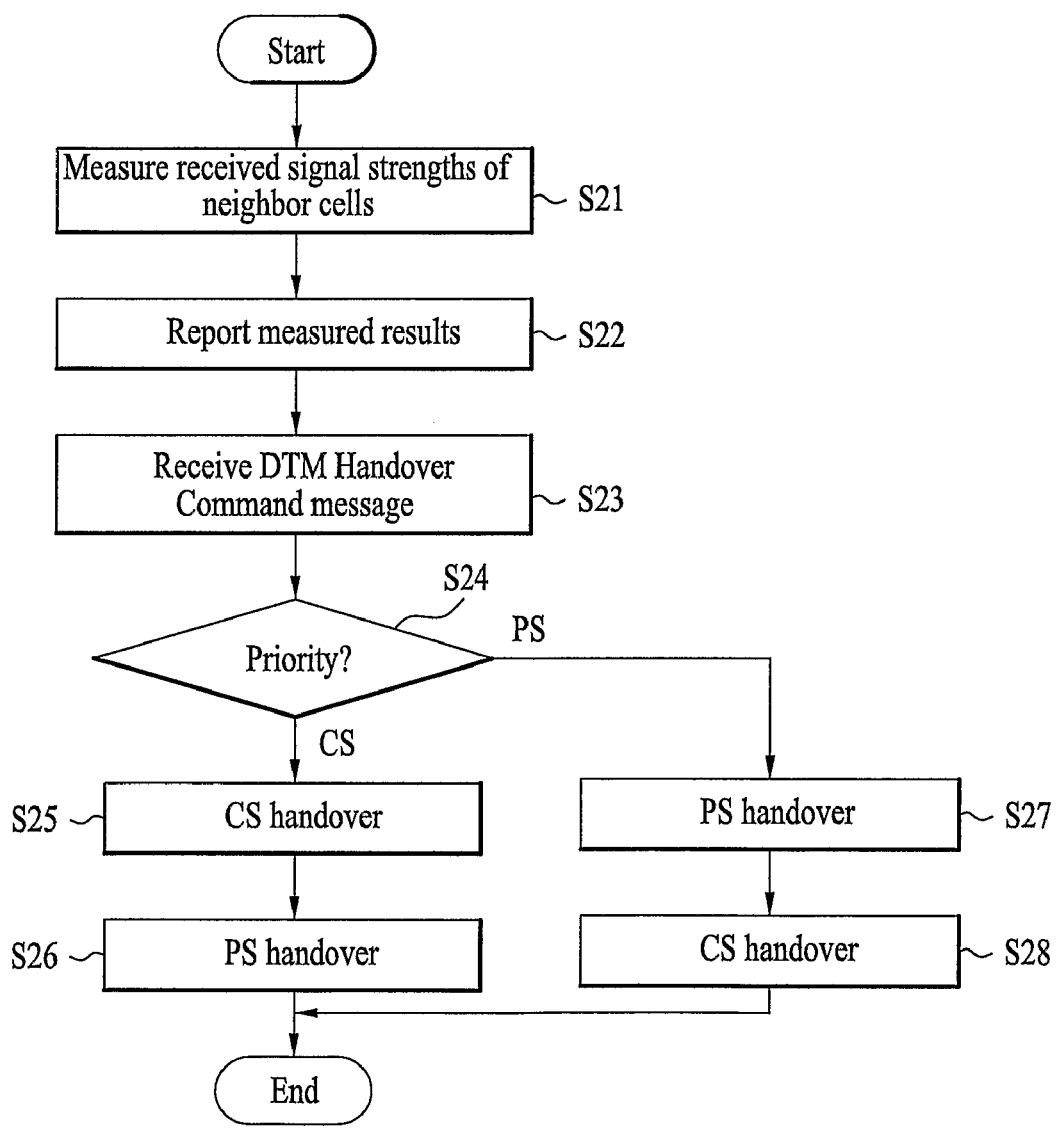
FIG. 2 is an exemplary diagram illustrating a process of a DTM handover procedure further illustrating contemplation of priority between the CS and the PS services.

FIG. 2 is an exemplary diagram illustrating a process of a DTM handover procedure further illustrating contemplation of priority between the CS and the PS services. As illustrated in FIG. 2, the MS measures the signal strengths of neighbor cells (S21). Thereafter, the MS transmits the measured signal strengths to the current cell to which connection is currently established (S22). Then the MS receives a DTM Handover Command message from the cell (S23). After receiving the DTM handover command message, the MS checks for priority between the CS and the PS (S24). If the CS is determined to have priority over the PS, the CS handover procedure can be initiated first with a new cell using the information contained in the Handover Command message (S25). After the CS handover procedure is initiated, the PS handover procedure can be initiated (S26). Alternatively, if the PS is determined to have priority over the CS, the PS handover procedure can be initiated first to the new cell using the information contained in the DTM Handover Command message (S27). After the PS handover procedure is initiated, the CS handover procedure can be initiated (S28).

Figure 3:
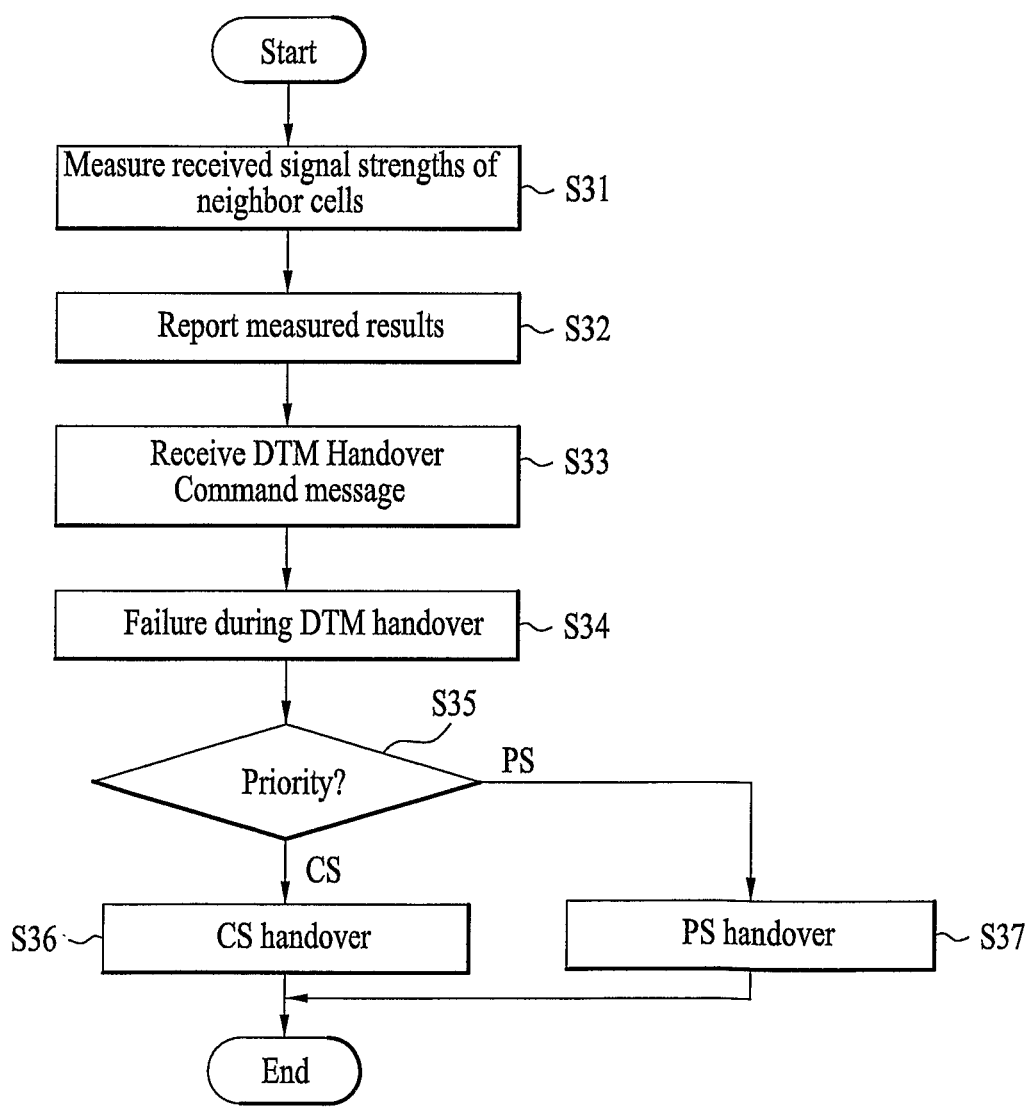
FIG. 3 is another exemplary diagram illustrating a process of a DTM handover procedure further illustrating contemplation of priority between the CS and the PS services.

FIG. 3 is another exemplary diagram illustrating a process of a DTM handover procedure further illustrating contemplation of priority between the CS and the PS services. If a failure arises during DTM handover, FIG. 3 illustrates which of either CS handover or PS handover to be performed first over the other. In other words, depending on which of the two (i.e., CS or PS) has priority, the MS can decide to perform the handover procedure for the selected service (CS service or PS service) when the MS cannot perform the handover procedure for both the CS service and the PS service due to the DTM handover failure. As illustrated in FIG. 3, the MS measures the signal strengths of neighbor cells (S31) and transmits the measured signal strengths of neighbor cells to the current cell (S32). Thereafter, the MS receives a DTM Handover Command message from the current cell (S33) and detects occurrence of failure during the DTM handover procedure using the information contained in the DTM Handover Command message (S34). Due to the DTM handover failure, if the handover of only one of either the CS connection or the PS connection can be successfully performed, the MS can check the priority between the CS and the PS (S35). After checking the priority, if the CS has priority over the PS, then the CS handover can be performed (S36). Alternatively, if the PS has priority over the CS, then the PS handover can be performed (S37).

In FIG. 2 or FIG. 3, during the CS connection and the PS connection, the MS regularly measures the strength of signals transmitted on the BCCH. If there is the PBCCH in the cell, the MS can measure the strength of signals transmitted on the PBCCH instead of the BCCH.

Figure 4:
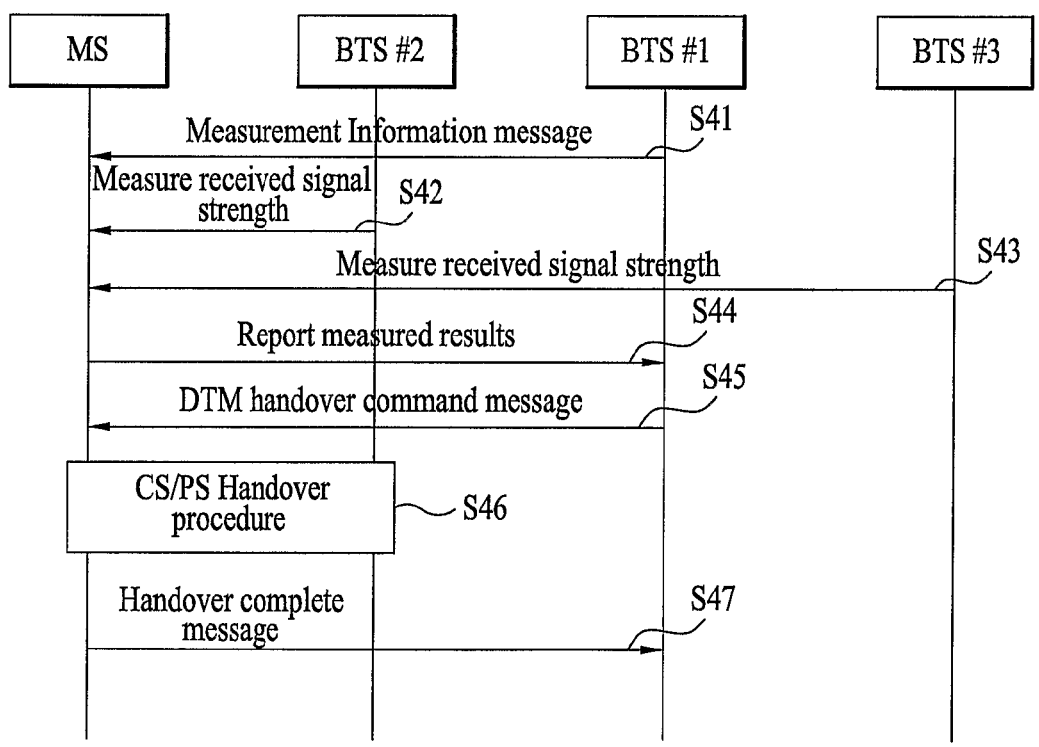
FIG. 4 is an exemplary diagram illustrating a signal process of handover procedure in an intra-cell environment.

FIG. 4 is an exemplary diagram illustrating a signal process of a DTM handover procedure in an intra-cell environment. As illustrated in FIG. 4, the MS receives a list of neighbor cells for measuring signal strengths and/or signal qualities of the neighbor cells from Cell #1 during DTM (S41). The list of neighbor cells is transmitted to the MS via a Measurement Information message.

The MS measures the received signal strengths from the cells (e.g., Cell #2, Cell #3) corresponding to the cells in the list of neighbor cells (S42, S43). Here, the measured signal strength is transmitted on the BCCH. Furthermore, the information of the MS measured signal strengths is transmitted to Cell #1 through a Measurement Report message, and more specifically, the information is transmitted through the Measurement Result Information Element included in the Measurement Report message (S44). In addition, the measured results can be transmitted via the parameters (i.e., RX_LEV, RX_QUAL) included in the Measurement Result Information Element to Cell #1.

If the network determines that DTM handover procedure should be performed based on the information of the MS measured signal strengths, the network via Cell #1 may send a DTM Handover Command message requesting the MS to switch to a different cell (e.g., Cell #2) managed by the same BSC (S45). Alternatively, the DTM Handover Command message can request the MS to switch to a different cell managed by a different BSC (S45).

Before the BSC instructs the MS to perform DTM handover, the BSC can activate the channels in a target cell (e.g., Cell #2). That is, Cell #2 can allocate the CS channels and the PS channels in Cell #2 to be used by the MS according to the multi-slot class. Here, the DTM Handover Command message can be transmitted on a Dedicated Control Channel (DCCH).

Upon receipt of the DTM Handover Command message, the MS can initiate the DTM Handover procedure. Because the CS handover and the PS handover are handled independently during the DTM handover, the MS can configure the process of each handover where the CS handover or the PS handover should be initiated according to the predefined priority (S46). After a series of procedures associated with each handover are completed and the main signaling link is established between the MS and the Cell #2, the MS can transmit the Handover Complete message to Cell #2 (S47). Furthermore, Cell #2 can transmit the Handover Complete message to the BSC, and subsequently, the BSC transmits the DTM Handover Complete message to the Mobile Services Switching Center (MSC) and the SGSN. Thereafter, the channels allocated to the MS while released by Cell #1, then the handover is completed.

Figure 5:
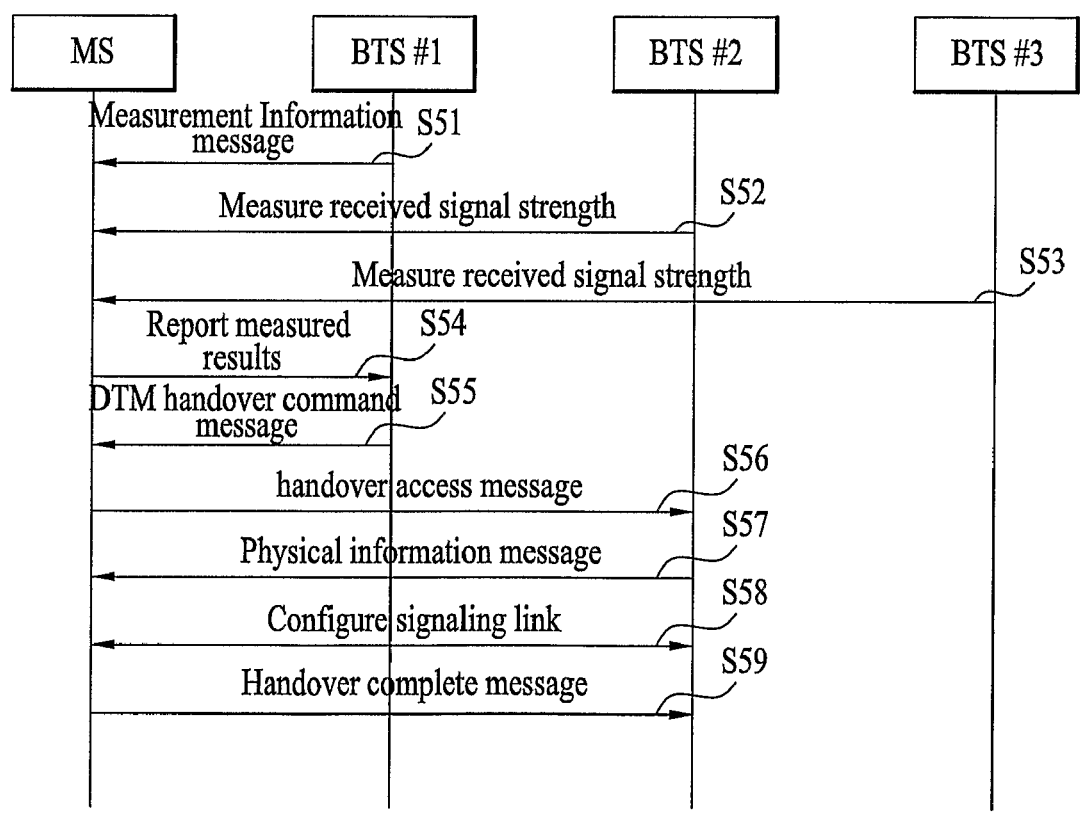
FIG. 5 is another exemplary diagram illustrating a signal process of a DTM Handover procedure in an intra-cell environment.

FIG. 5 is another exemplary diagram illustrating a signal process of a DTM Handover procedure in an intra-cell environment. As described with respect to FIG. 4, steps S51-S55 are same as steps S41-S45.

Alternatively, upon receipt of the DTM Handover Command message, the MS can abandon the packet session and can initiate the access on the target cell. That is, after receiving the DTM Handover Command message, the MS can transmit a Handover Access message on the target cell (Cell #2) (S56). In response, Cell #2 can transmit a Physical Information message to the MS (S57). The Physical Information message includes a value of the TA for synchronizing with Cell #2 so as to allow the GSM/GPRS operation to resume. Using the Physical Information message, when the main signal link between the MS and Cell #2 is established (S58), the MS can transmit a RA/cell update message to a Serving GPRS Support Node (SGSN) for the PS connection and can transmit a DTM Handover Complete message to Cell #2 (S59).

If Cell #2 supports DTM, the handover procedure can be performed according to the process described above. However, if Cell #2 does not support DTM, the handover procedure can be changed based on the priority value (i.e., Priority_DTM value) between the CS and the PS. For example, if 'Priority_DTM=CS channel,' the CS is given priority over the PS. As such, in operation, the PS connection is released when the MS receives the DTM Handover Command message from the cell, and the handover procedure is performed as if there is only the CS connection available. Alternatively, if 'Priority_DTM=PS channel,' the PS is given priority over the CS. As such, in operation, the CS connection is released when the MS receives the DTM Handover Command message from the cell, and the handover procedure is performed as if there is only the PS connection available.

Figure 6:
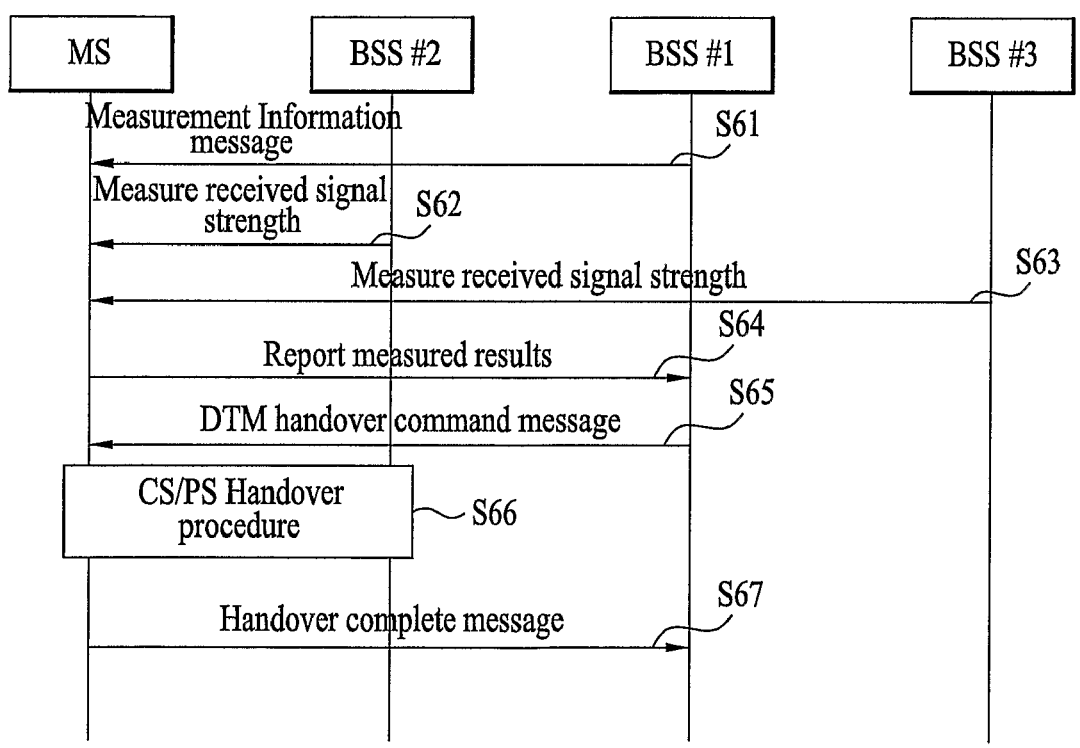
FIG. 6 is an exemplary diagram illustrating a signal process of handover procedure in an inter-cell environment.
Figure 7:
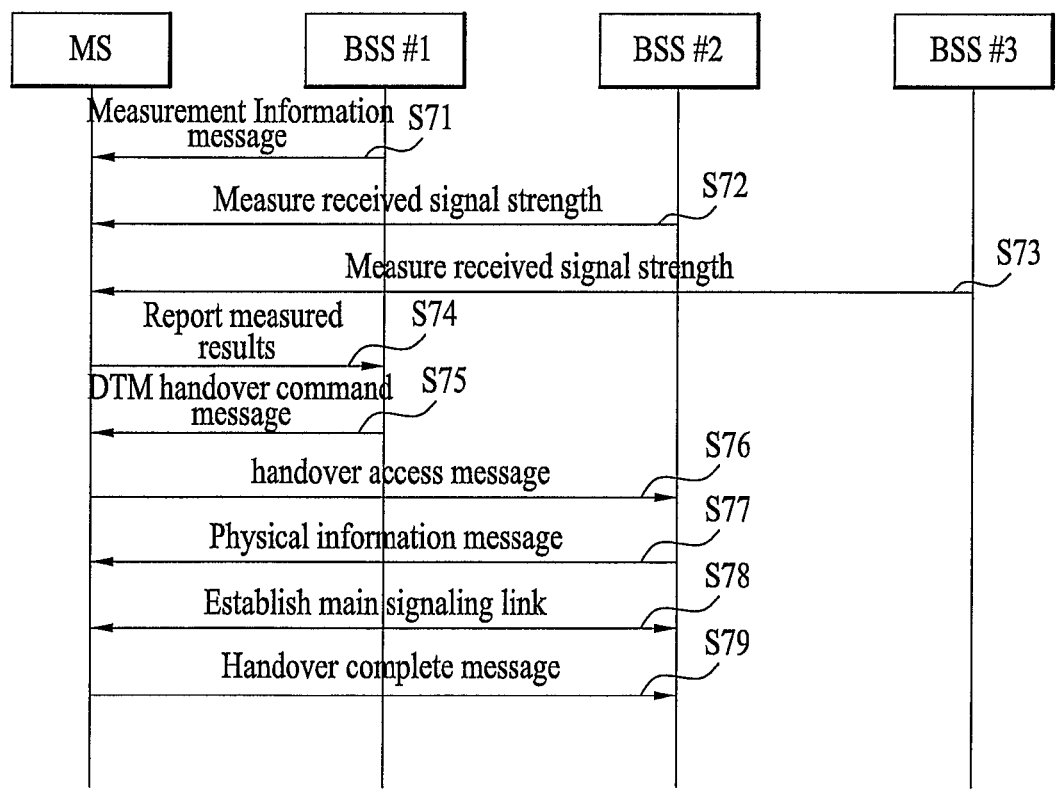
FIG. 7 is another exemplary diagram illustrating a signal process of handover procedure in an intra-cell environment.

FIG. 6 and FIG. 7 depict exemplary diagrams illustrating a signal process of a DTM Handover procedure in an inter-cell environment. More specifically, a detailed description of FIG. 6 can be referred to the detailed description of FIG. 4, the different being that FIG. 6 relates to the inter-cell environment. Similarly, a detailed description of FIG. 7 can be referred to the detailed description of FIG. 5, the difference being that FIG. 7 relates to the inter-cell environment. As such, the detailed description of FIGS. 6 and 7 are provided with respect to FIGS. 4 and 5, respectively.

Figure 8:
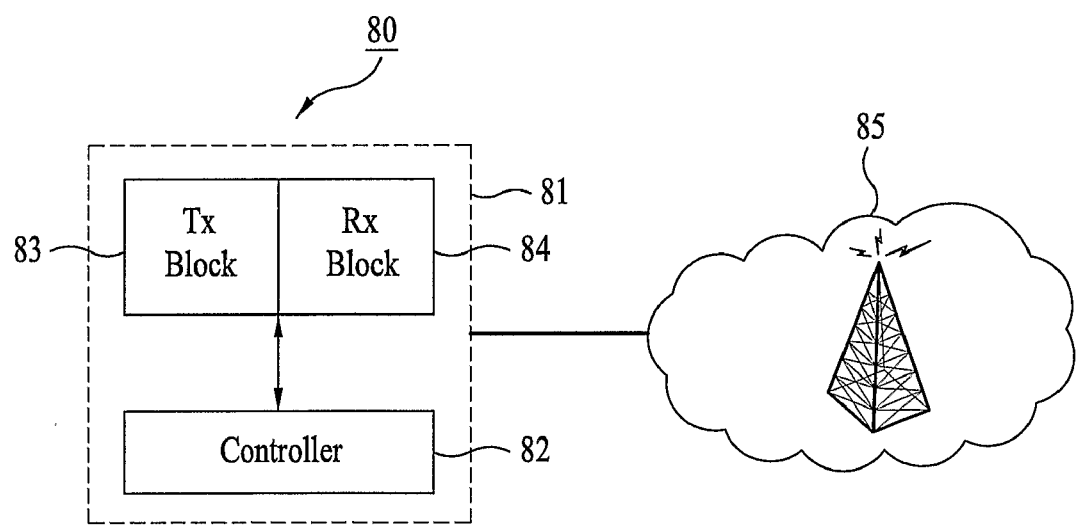
FIG. 8 is an exemplary diagram illustrating a structure of a device for performing the functions according to the embodiment of the present invention.

FIG. 8 is an exemplary diagram illustrating a structure of a device for performing the functions according to the embodiment of the present invention. More specifically, a device 80 (e.g., mobile station) comprises a Radio Frequency (RF) module 81 and a controller 82. The RF module can be further divided into a transmitting block 83 and a receiving block 84. That is, the receiving block 84 can be used for receiving information of neighbor cells. Here, the information includes neighbor cells whose signal strengths and/or signal qualities the device can measure. After the signal strengths/qualities are measured, the device can use the transmitting block 83 to transmit results of the measured signal strengths of the neighbor cells to a network 85 (e.g., BSC, BSS, BTS).

After the network 85 receives the results of the measured signal strengths, based on the results, the network 85 can instruct the device 80 to perform DTM handover with one of the neighbor cells. Then the receiving block 84 can receive a DTM Handover Command message from the network 85. Thereafter, the device 80 can perform the DTM handover procedure with the neighbor cell designated by the network 85.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of performing a handover by a mobile station (MS) which has a circuit-switched (CS) connection and a packet-switched (PS) connection with a cell in a wireless mobile communication system, the method comprising:
    receiving, by the MS, a PS Handover Command message and a CS Handover Command message separately from a network if the MS does not support a Dual Transfer Mode (DTM) handover, wherein the PS Handover Command message includes resource information for performing a PS handover with a new cell, and wherein the CS Handover Command message includes resource information for performing a CS Handover with the new cell;
    receiving, by the MS, a DTM Handover Command message from the network if the MS supports the DTM handover, wherein the DTM Handover Command message includes resource information for performing the CS handover and the PS handover with the new cell;
    performing, by the MS, the CS handover and the PS handover with the new cell based either on the resource information of the DTM Handover Command message or on both the resource information of the PS Handover Command message and the resource information of the CS Handover Command message, in order to establish a CS connection and a PS connection with the new cell; and
    transmitting, by the MS, a Handover Complete message to the network after the CS handover and the PS handover are completed.

2. The method of claim 1, wherein the CS handover and the PS handover are performed according to a pre-defined priority.

3. The method of claim 2, wherein the pre-defined priority is determined at an application layer of the MS.

4. The method of claim 1, wherein the DTM Handover Command message is received on a Dedicated Control Channel (DCCH).

5. A mobile station (MS) which has a circuit-switched (CS) connection and a packet-switched (PS) connection with a cell in a wireless mobile communication system, the mobile station comprising:
- means for receiving a PS Handover Command message and a CS Handover Command message separately from a network if the MS does not support a Dual Transfer Mode (DTM) handover, wherein the PS Handover Command message includes resource information for performing a PS handover with a new cell, and wherein the CS Handover Command message includes resource information for performing a CS Handover with the new cell;
- means for receiving a Dual Transfer Mode (DTM) Handover Command message from the network if the MS supports the DTM handover, wherein the DTM Handover Command message includes resource information for performing the CS handover and the PS handover with the new cell; and
- means for performing the CS handover and the PS handover with the new cell based either on the resource information of the DTM Handover Command message or on both the resource information of the PS Handover Command message and the resource information of the CS Handover Command message, in order to establish a CS connection and a PS connection with the new cell; and
- means for transmitting a Handover Complete message to the network after the CS handover and the PS handover are completed.

6. The mobile station of claim 5, wherein the CS handover and the PS handover are performed according to a pre-defined priority.

7. The mobile station of claim 6, wherein the pre-defined priority is determined at an application layer of the MS.

8. The mobile station of claim 5, wherein the DTM Handover Command message is received on a Dedicated Control Channel (DCCH).

* * * * *